(12) United States Patent
Thannikary et al.

(10) Patent No.: US 7,296,810 B2
(45) Date of Patent: Nov. 20, 2007

(54) APPARATUS AND METHOD FOR INSTALLING A SENSOR IN CONNECTION WITH RELATIVELY MOVABLE MEMBERS FOR SENSING RELATIVE POSITION THEREOF WITHOUT ADJUSTMENT

(75) Inventors: James Thannikary, Aurora, IL (US); Edmund R. Henkel, Naperville, IL (US); Thomas M. Danca, Tinley Park, IL (US)

(73) Assignee: CNH America LLC, New Holland, PA (US)

( * ) Notice: Subject to any disclaimer, the term of this patent is extended or adjusted under 35 U.S.C. 154(b) by 429 days.

(21) Appl. No.: 10/931,702

(22) Filed: Sep. 1, 2004

(65) Prior Publication Data

US 2005/0218312 A1  Oct. 6, 2005

Related U.S. Application Data

(60) Provisional application No. 60/558,458, filed on Apr. 1, 2004.

(51) Int. Cl.
*B62D 5/06* (2006.01)
(52) U.S. Cl. .................. 280/93.5; 280/93.512
(58) Field of Classification Search ........... 280/93.512, 280/93.5
See application file for complete search history.

(56) References Cited

U.S. PATENT DOCUMENTS

| | | |
|---|---|---|
| 3,438,646 A | 4/1969 | Hannapel |
| 3,498,254 A | 3/1970 | Heidenhain et al. ........ 235/486 |
| 4,139,947 A | 2/1979 | Possati ........................ 33/531 |
| 4,775,026 A | 10/1988 | Sollbach et al. ............ 180/249 |
| 4,866,981 A | 9/1989 | Matsumoto et al. ....... 73/118.1 |
| 4,903,525 A | 2/1990 | Chiba et al. .................. 73/116 |
| 5,366,042 A | 11/1994 | Wilks et al. ................ 180/253 |
| 5,408,894 A | 4/1995 | Henson ..................... 73/866.5 |
| 5,636,703 A | 6/1997 | Papke et al. ................ 180/400 |
| 5,647,396 A | 7/1997 | Stommes et al. ........... 137/554 |
| 5,661,890 A | 9/1997 | Pfaffenberger ............. 29/426.6 |
| 5,981,940 A | 11/1999 | Setbacken et al. ..... 250/231.13 |
| 6,237,906 B1 | 5/2001 | Deans et al. |

(Continued)

FOREIGN PATENT DOCUMENTS

DE  35 37 235 A1  4/1987

(Continued)

*Primary Examiner*—Paul N. Dickson
*Assistant Examiner*—Drew J. Brown
(74) *Attorney, Agent, or Firm*—Patrick M. Sheldrake; John William Stader; Michael G. Harms

(57) ABSTRACT

Apparatus and a method for installing a sensor in connection with relatively movable members for sensing relative position thereof without adjustment, the sensor including a body mountable in a predetermined position on a first of the members, and a coupler being adjustably connectable to a second of the members and connectable in predetermined relation to an input of the sensor for coupling the input to the second member. The coupler is adjustably connectable to the second member in a predetermined relation to the first member such that when the input is connected to the coupler and the body is mounted in the predetermined position on the first member, the input and the body portion will be relatively positioned such that the sensor will provide a predetermined signal when the first and second members are in predetermined relative position.

18 Claims, 4 Drawing Sheets

U.S. PATENT DOCUMENTS

| | | |
|---|---|---|
| 6,261,182 B1 | 7/2001 | Chino et al. .................. 464/89 |
| 6,293,022 B1 | 9/2001 | Chino et al. ............. 33/203.18 |
| 6,311,402 B1 | 11/2001 | Brandl et al. ................ 33/1 PT |
| 6,417,664 B1 | 7/2002 | Ventroni et al. ......... 324/207.2 |
| 6,460,429 B1 | 10/2002 | Staker ......................... 74/513 |
| 6,486,764 B2 | 11/2002 | Byram ....................... 336/110 |
| 6,494,471 B2 | 12/2002 | Lukac ....................... 280/93.5 |
| 6,502,839 B1 | 1/2003 | Chino et al. ........... 280/93.512 |
| 6,568,696 B2 | 5/2003 | Osborn et al. ............. 280/93.5 |
| 6,597,168 B1 | 7/2003 | Lee .......................... 324/207.2 |
| 2002/0070071 A1 | 6/2002 | Schuh |
| 2002/0070520 A1 | 6/2002 | Osborn et al. |
| 2002/0089142 A1 | 7/2002 | Lukac |

FOREIGN PATENT DOCUMENTS

| | | |
|---|---|---|
| DE | 199 41 168 A1 | 3/2000 |

APPARATUS AND METHOD FOR INSTALLING A SENSOR IN CONNECTION WITH RELATIVELY MOVABLE MEMBERS FOR SENSING RELATIVE POSITION THEREOF WITHOUT ADJUSTMENT

This Patent Application claims priority from U.S. Provisional Patent Application Ser. No. 60/558,458, filed Apr. 1, 2004.

TECHNICAL FIELD

This invention relates generally to apparatus and a method for installing a sensor, and more particularly, to apparatus and a method for installing a sensor in adjustable connection with relatively movable members, particularly a steerable wheel of a vehicle and related structure, for accurately sensing relative position thereof, without requiring adjusting the sensor during or after the installation.

BACKGROUND ART

Commonly, a sensor for sensing relative position of members require some adjustment of the sensor during installation. For instance, a sensor for sensing a rotational position or steering angle of a wheel and/or wheel hub assembly of a vehicle about a steering axis typically must be installed such that correct electrical outputs are produced when the wheel and/or hub assembly is in a center or straight ahead position and in a range of rotated or turned positions. Achieving this commonly entails a trial and error process wherein the sensor is mounted or installed, and then is adjusted, such as by applying a voltage input to the sensor and rotating it while in its mounted position and measuring voltage outputs, until an orientation is found wherein desired output or outputs are obtained. The sensor is then fixed in that orientation. Disadvantages of this process include the time and equipment required for the trial and error steps, and inconvenience due to the location of the sensor in connection with a steering system which is typically in a difficult to access location such as beneath the vehicle or in a steering assembly. If exposes, and adjustably mounted, the sensor can be jarred out of adjustment, and fasteners holding the sensor in an adjusted position can become loosened. Additionally, an extension such as a shaft or other member is commonly required to connect the sensor input to the relatively movable member to which it is to be connected, which can add another variable to the adjustment process. Reference in this regard, Lukac U.S. Pat. No. 6,494,471B1 issued Dec. 17, 2002 to New Holland North America, Inc., and Chino et al. U.S. Pat. No. 6,261,182B1 issued Jul. 17, 2001 to Kabushiki Kaisha Toyoda Jidoshokki Seisakusho of Japan.

In a similar manner, when a linear sensor actuated by a lever must be installed such that a correct electrical output is produced when the lever is in a particular position, such as a center position, a trial and error adjustment process is typically also required.

Thus, what is sought is apparatus and a method for installing a sensor in connection with relatively movable members such as an axle assembly and a steerable wheel, which overcomes one or more of the disadvantages set forth above.

SUMMARY Of THE INVENTION

According to the invention, apparatus and a method for installing a sensor in connection with relatively movable members for sensing relative position thereof, without requiring adjustment of the sensor, which overcomes many of the disadvantages set forth above, is disclosed. According to a preferred apparatus and method of the invention, the sensor includes a body or portion mountable in a predetermined position on a first of the members and an input or portion movable relative to the body or other portion, the sensor being operable for providing a signal representative of a position of the input relative to the body, including a predetermined signal representative of a predetermined position of the input. The invention utilizes a coupler adjustably connectable to a second of the members and connectable in predetermined relation to the input of the sensor for coupling the input to the second member. The coupler can be adjustably connected to the second member in a predetermined relation to the first member such that when the input of the sensor is connected to the coupler and the body is mounted in the predetermined position on the first member, the input and the body will be relatively positioned such that the sensor will provide the predetermined signal when the first and second members are in the predetermined relative position. The input of the sensor is connected in the predetermined relation to the coupler and the body is mounted in the predetermined position on the first member, such that when one or both of the first and second members are moved so as to be in different relative positions, the sensor will provide signals representative of the different relative positions, respectively, including the predetermined signal when the members are in the predetermined relative position.

As a result of using the installation method according to the invention, when the sensor is installed, it is in proper position and orientation relative to the second member for providing or outputting a signal representative of the predetermined relative position, which can represent a straight ahead orientation in the instance of a steering assembly, as well as predetermined signals representative of a range of relatively rotated positions of the members, which can, for instance, represent rotational positions of elements of the steering assembly, such as of a wheel and hub assembly relative to another structure such as an axle housing, supporting kingpin, or other related structure.

The sensor input is preferably connected to the second relatively rotatable member via a pin or shaft, to allow the sensor to be positioned a desired distance away. The coupler can thus be placed on the pin or shaft and rotated thereabout to achieve a required rotational orientation to provide the required signals. Once oriented, the coupler can then be secured to the pin or shaft in any suitable manner to prevent relative rotation thereof, including using a common fastener such as a screw threadedly receivable in a threaded hole in an end of the shaft opposite the second member, a press fit, or the like. The coupler and the sensor input can include matingly engageable elements, such as, but not limited to, a hexagonal or other multifaceted male element receivable in a correspondingly faceted female receptacle for joint rotation. The sensor can be provided with the input positioned in a predetermined rotational orientation or position relative to the body, such that when the input is matingly engaged with the coupler and the body portion is mounted, all elements of the sensor will be properly positioned or oriented corresponding to the position or rotational orientation of the second member such that no positioning or other adjustment of the sensor is required.

DETAILED DESCRIPTION Of THE INVENTION

Figure 1:
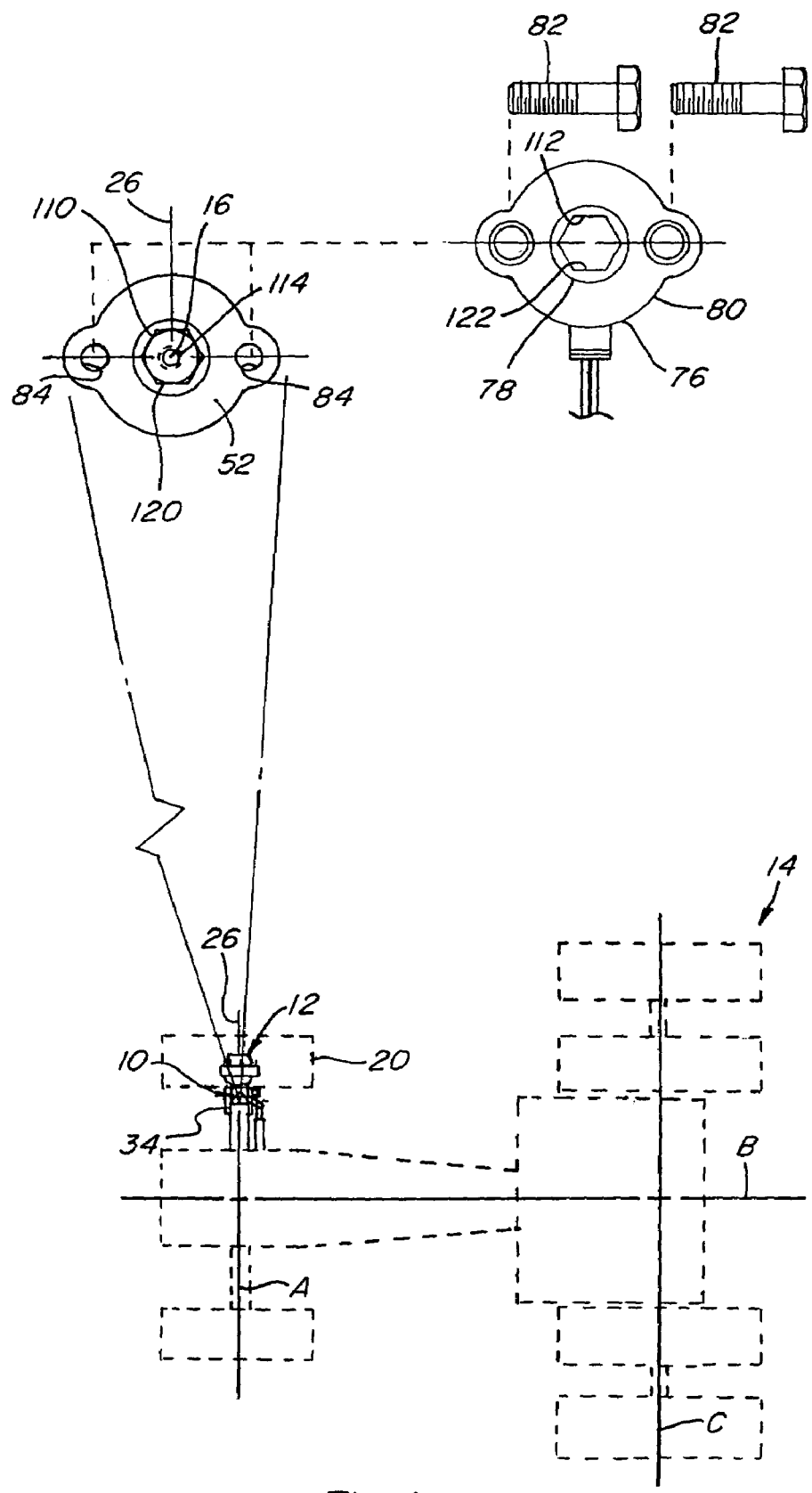
FIG. 1 is a simplified schematic top view of a tractor including an axial housing having an end supporting a steerable wheel including apparatus for sensing an angular position thereof according to the invention.

Referring now to the drawings, in FIGS. 1, 2, 3 and 4, apparatus 10 of the invention for installing a sensor for sensing angular position of a wheel hub assembly 12 of the vehicle 14 about a generally vertical steering axis 16 extending through wheel hub assembly 12, is shown. Wheel hub assembly 12 is a conventionally constructed and operable wheel hub assembly including a housing 18 to which is mountable a conventional wheel and tire assembly 20 (FIG. 1) on a mounting flange 22 using an array of lugs 24. Housing 18 and wheel and tire assembly 20 are rotatable about a generally horizontal drive axis 26 extending therethrough and through wheel hub assembly 12 in the well known manner. Wheel and tire assembly 20 and housing 18 are additionally rotatable with wheel hub assembly 12 about steering axis 16, also in the well known manner. Vehicle 14 shown is a conventionally constructed and operable tractor which is representative of a wide variety of other agricultural work machines, construction machines, mining machines, forestry machines, and the like, for which the present apparatus has utility. Here, it should be appreciated that although apparatus 10 and the method of installation according to the invention have utility for use with a wide variety of steerable wheel arrangements, including non-driven or powered wheels, apparatus 10 and the method of the invention are particularly advantageous for use with wheels of relatively heavy work machines and vehicles like vehicle 14, due to the ability to install a rotational position sensor without adjustment, so as to be capable of providing accurate, reliable sensing of angular position of the wheel hub and thus the wheel mounted thereto relative to a desired or selected reference. Apparatus and the installation method of the invention also facilitate and allow removal and disassembly of apparatus 10 and also the components of wheel hub assembly 12, and reinstallation and assembly, without requiring adjustment of the sensor. Apparatus 10 and the method of the invention also have utility for installation of sensors for a wide variety of other applications involving relatively movable members and thus are not to be considered to be limited to the embodiment set forth herein.

Wheel hub assembly 12 includes a C shape support frame 28 which supports housing 18 for rotation about drive axis 26. Support frame 28 includes an upper arm 32 projecting in cantilever relation from the top of a central portion and a lower arm (not shown) projecting in cantilever relation from the bottom of central portion, thereby defining a space 36 therebetween in which is located an axle housing end 34. Upper arm 32 has a passage 38 therethrough coaxial with steering axis 16, in which an upper kingpin 40 is fixedly mounted. The lower arm includes a similar passage therethrough which receives a lower kingpin (also not shown). Upper kingpin 40 and the lower kingpin connect wheel hub assembly 12 to axle housing end 34 for relative rotation or steering movement about steering axis 16. The steering movements of wheel hub assembly 12 and the wheel and tire assembly 20 mounted thereto about steering axis 16 are effected by longitudinal movements of a tire rod 42, connected at one end to wheel hub assembly 12 and at an opposite end to a conventional steering input device (not shown) on vehicle 14, which input device can be manually controlled, typically by a steering wheel, and/or automatically controlled by an automatic guidance system connected to apparatus 10 for receiving steering angle information therefrom.

Figure 3:
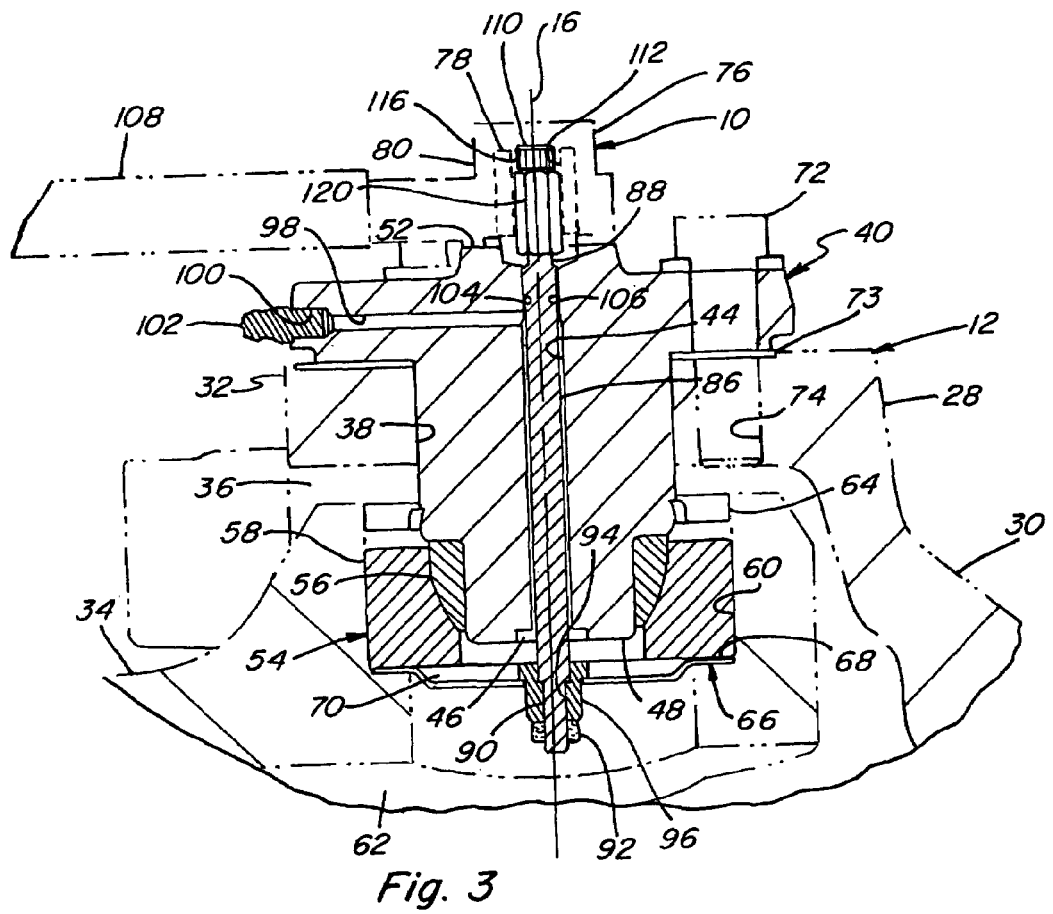
FIG. 3 is a fragmentary sectional view of the end of the axle housing and wheel hub of FIG. 2, showing the apparatus of the invention.
Figure 4:
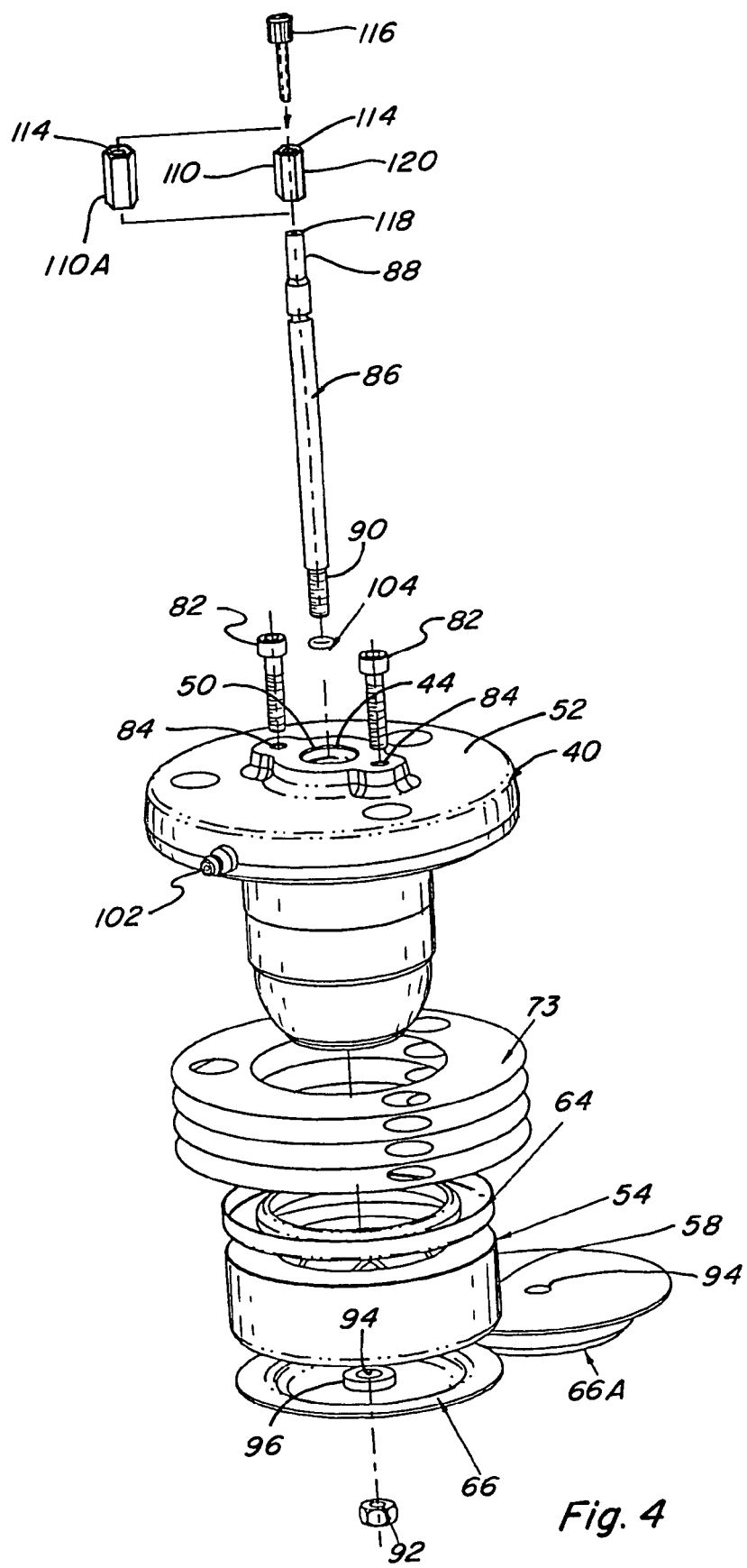
FIG. 4 is an exploded view of an upper kingpin assembly for rotatably connecting the end of the axle housing and the wheel hub of FIGS. 2 and 3, showing a pin and a coupler installable according to a method of the invention.

As best shown in FIGS. 3 and 4, upper kingpin 40 includes an axial passage 44 therethrough extending between a lower axial opening 46 on a bottom axial end portion 48 of kingpin 40, and an upper opening 50 on a top surface 52 thereof. By the usage of the term "axial" in connection with passage 44 herein, it is meant that steering axis 16 extends through passage 44, but not necessarily that passage 44 has a central axis coincident with steering axis 16.

Bottom axial end portion 48 of upper kingpin 40 is received in a bearing assembly 54 including an inner bearing ring 56 which mounts to bottom axial end portion 48 for rotation therewith relative to an outer bearing ring 58. As shown in FIG. 3, outer bearing ring 58 is receivable in an axial counter bore 60 forming a bearing seat in axle housing end 34. Beneath counter bore 60 is an open space 62 within axle housing end 34. An annular grease seal 64 is receivable in counter bore 60 to form a sealed condition around kingpin 40 above bearing assembly 54, for preventing or limiting passage of grease upwardly around the kingpin as desired.

A grease retainer 66 or 66A (FIG. 4) is positionable on and fixedly mounted to a lower shoulder 68 of axle housing end 34 around counter bore 60 beneath outer bearing ring 58, for preventing passage of grease therebelow into space 62. Retainer 66 or 66A is preferably fixedly mounted to shoulder 68 using an adhesive sealant such as commonly available under the Loctite tradename. Retainer 66 or 66A thus defines a lower periphery of a lubricant cavity 70 which has an upper periphery enclosed by seal 64 around kingpin 40. Thus, it is evident that axial passage 44 through kingpin 40 extends between top surface 52 of kingpin 40 and lubricant cavity 70.

Kingpin 40 is mounted in passage 38 of wheel hub assembly 12 in a predetermined orientation about steering axis 16 and in predetermined relation to a first reference associated with wheel hub assembly 12, such as drive axis 26 or an associated element such as a surface of flange 22 of wheel hub assembly 12 against which wheel and tire assembly 20 is or will be mounted and which establishes the direction of rotation of wheel and tire assembly 20, using a plurality of bolts 72 threadedly received in threaded holes 74 in upper arm 32 at predetermined spaced angular locations around passage 38 and steering axis 16. One or more shims 73 can be disposed between kingpin 40 and the surface of arm 32 as required for height adjustment. With bottom axial end portion 48 of kingpin 40 received in inner bearing ring 56, and inner bearing ring 56 received in outer bearing ring 58 mounted in counter bore 60 of axle housing end 34, and with a similar lower kingpin arrangement on the bottom, wheel hub assembly 12 is connected to and can support axle housing end 34, and is rotatable about steering axis 16 relative thereto in the well known manner.

A sensor 76 is provided for determining or sensing the rotational or steering position of wheel hub assembly 12 about axis 16 relative to a second reference, which is associated with vehicle 14. Sensor 76 can be, for instance, but is not limited to, a well known, commercially available Hall effect type sensor or a potentiometer, including circuitry which when powered is operable for sensing or detecting a rotational position or orientation of an input element 78 which is preferably supported for rotation in or extends into or through a body portion 80 of sensor 76. According to the invention, body portion 80 is fixedly mountable in a predetermined position on top surface 52 of kingpin 40 in a predetermined angular orientation about steering axis 16 relative to the first reference associated the wheel such as drive axis 26 or the associated element such as the outer surface of flange 22 of wheel hub assembly 12 against which wheel and tire assembly 20 is mounted. This can be accomplished in a suitable manner, such as using screws 82 threadedly receivable in threaded holes 84 located at predetermined locations in top surface 52 relative to the first reference.

Because the positions of threaded holes 74 in upper arm 32 of wheel hub assembly 12 relative to the first reference such as drive axis 26 are known, and the positions of threaded holes 84 in kingpin 40 to the first reference are known, when kingpin 40 is installed in the predetermined orientation on upper arm 32, and body portion 80 of sensor 74 is installed on kingpin 40, body portion 80 will be in a known relation to the first reference, and, when the first reference is in a particular position, for instance, a straight ahead position, body portion 80 will be in known relation to that position. As a result, when hub assembly 12 and kingpin 40 are rotated about steering axis 16 relative to axle housing end 34 from the known rotational position, body portion 80 of sensor 76 and drive axis 26 are correspondingly rotated relative thereto, and, by holding or fixing input element 78 of sensor 76 to axle housing end 34, sensor 76 would be caused to change state corresponding to the relative rotation.

Referring more particularly to FIGS. 3 and 4, apparatus 10 includes a pin 86 for connecting axle housing end 34 to input element 78 of sensor 76 through axial passage 44 of kingpin 40. Pin 86 has an upper end 88 and an opposite lower end 90. Discussing lower end 90 first, that end is fixedly mountable or connected in a suitable manner to grease retainer 66 or 66A, which is modified for that purpose, and, in turn, is fixed to lower shoulder 68 in counter bore 60 of axle housing end 34 as explained above. As a result, when wheel hub 12 is rotated about steering axis 16 relative to axle housing end 34, kingpin 40 and sensor body 80 will correspondingly rotate about pin 86. Pin 86 can be fixedly mounted or connected to retainer 66 or 66A in any suitable manner. For instance, here, retainer 66 or 66A is modified to include an axial hole 94 therethrough adapted for receiving lower end 90 of pin 86, which is threaded for threadedly receiving a nut 92. A flanged sleeve 96 is insertable from above into an axial hole in retainer 66 or 66A and includes hole 94 therethrough for receiving end 90 of pin 86. Pin 86 is thus securable to retainer 66 or 66A by threaded engagement with nut 92. An advantage of this construction is that it allows pin 86 to be installed after kingpin 40 and retainer 66 or 66A are installed, and without positioning or aligning of either retainer 66 or 66A and/or pin 86 about steering axis 16 to a reference such as drive axis 26.

Kingpin 40 additionally preferably includes a lateral passage 98 therethrough extending between an external opening 100 and axial passage 44. A cap or grease fitting 102 can be threadedly or otherwise disposed in external opening 100. This provides a path for introduction of lubricant, such as grease, into axial passage 44, through which the lubricant can flow into lubricant cavity 70, for lubricating bearing assembly 54. To contain and prevent passage of lubricant upwardly through passage 44 around pin 86, pin 86 of the invention preferably includes an O-ring groove 104 therearound, for receiving an O-ring 106 (FIG. 3), for forming a sealed condition with the inner surface of passage 44 around pin 86 when installed therein. Other means, such as a grease seal, could also be provided between pin 86 and kingpin 40 at a location above lateral passage 98, as required or desired.

Figure 2:
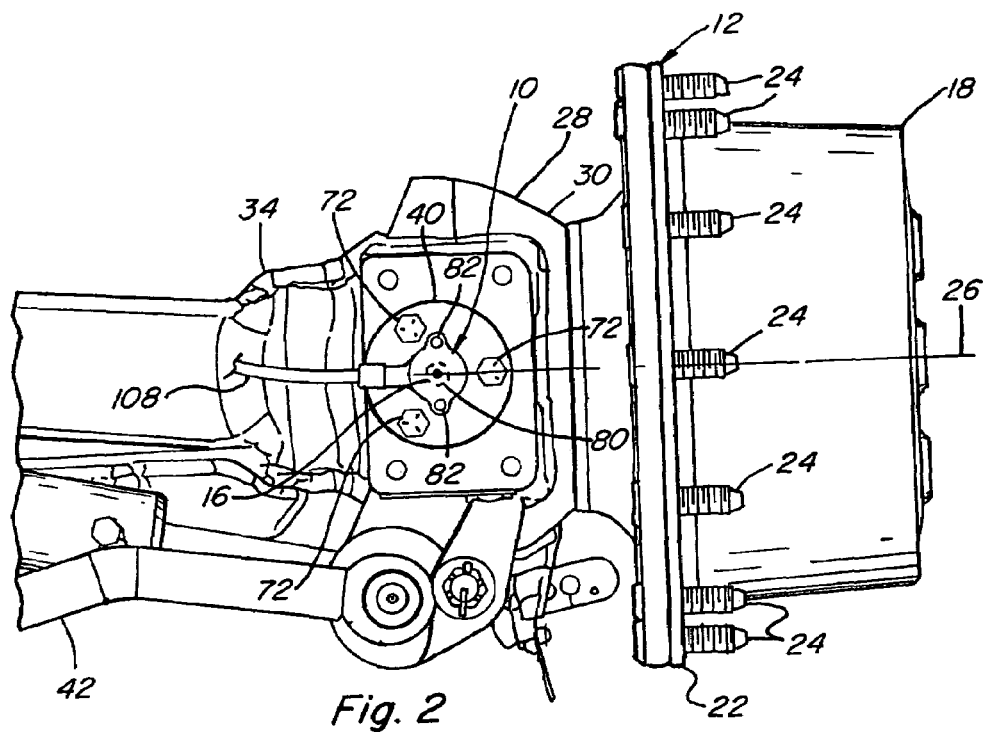
FIG. 2 is a fragmentary top view of the axle housing end and a hub of the steerable wheel, showing apparatus of the invention.

Sensor 76 is operable for outputting a signal representative of a state thereof, such as, but not limited to, a relative rotational position of input element 78 and body portion 80, over a suitable conductive path, such as a wire of a wiring harness 108 (FIGS. 2 and 3). Referring more particularly to FIG. 1, for the purposes of the present application, it is desired that this signal be representative of a rotational or steering position of wheel hub assembly 12 and wheel and tire assembly 20, represented by drive axis 26, relative to a selected second reference such as, but not limited to, a centerline of axle housing end 34, denoted by line A; a centerline of vehicle 14, denoted by line B, and/or another reference such as a centerline of rear axle of vehicle 14, denoted by line C. It is also desired that sensor 76 be installable so as to accurately output this information without requiring adjustment or repositioning.

Apparatus 10 of the invention achieves this capability by providing a coupler 110 which is mountable on upper end 88 of pin 86 in a required rotational position about axis 16 relative to the first reference associated with wheel hub assembly 12, such as drive axis 26 or the mounting surface of mounting flange 22. Coupler 110 is cooperatively engageable in a predetermined, non-relatively rotatable manner, with input element 78 of sensor 76, for connecting element 78 to axle housing end 34. Thus, with coupler 110 mounted on upper end 88 of pin 86 in predetermined relation to the first reference, element 78 in a predetermined rotational position relative to body portion 80, and body portion 80 in predetermined relation to the first reference, when powered, sensor 76 will output a signal accurately representative of the rotational or steering position of wheel hub assembly 12 relative to vehicle 14. For instance, if wheel hub assembly 12 is in a predetermined steering position, such as the straight ahead position, sensor 76 when powered will output a predetermined signal representative of that position, and different predetermined signals when wheel hub assembly 12 is rotated relative to axle housing end 34 to different steering positions.

Coupler 110 preferably has an outer surface having a predetermined shape which is cooperatively receivable in a correspondingly shape receptacle 112 of element 78 of sensor 76, for locking coupler 110 and element 78 together when the sensor is installed. Coupler 110 is preferably of tubular construction or includes an axial hole 114 therethrough (FIG. 4) for cooperatively receiving upper end 88 of pin 86. This allows coupler 110 to be placed on upper end 88 in a predetermined orientation or relationship to a selected reference, which can be, for instance, the first reference discussed above associated with wheel hub assembly 12. This can be done in any suitable convenient manner such as using a jig or tool, and/or a laser alignment device, and/or one or more lines, surfaces or marks on the components, if any. When coupler 110 is in the required position, it can be secured in place by a screw 116 insertable through hole 114 and threadedly receivable in a threaded hole 118 in upper end 88, such that coupler 110 and pin 86 will be locked together. In this regard, upper end 88 and hole 114 in coupler 110 can have outer and inner surfaces, respectively, which are optionally tapered and relatively sized such that coupler 110 will be press fit on upper end 88 as screw 116 is threaded therein and/or as body portion 80 is screwed onto surface 52 of the kingpin. Coupler 110 shown includes a hexagonal outer surface 120 which matingly engages a corresponding hexagonal inner surface 122 in receptacle 112 of element 78 of sensor 76 (FIG. 1) when received therein, for locking pin 86, coupler 110 and element 78 together when sensor 76 is installed on kingpin 40. Thus, one or more of the flat surfaces of outer surface 120 could be used for the alignment. Alternatively, coupler 110 and receptacle 112 can have other mating shapes, such as, but not limited to, shapes having one or more flat sides such as a D shape (illustrated by alternative coupler 110A in FIG. 4). As a general rule, for more precision in the alignment, coupler 110 would have a greater number of flat sides. As another alternative, it is contemplated that a receptacle 112 could be provided on coupler 110 and element 78 could include a projection receivable in receptacle 112 on coupler 110, if desired. Before or when sensor 76 is installed, element 78 will be oriented in a predetermined position in body 80 so as to be operable for outputting a signal having a predetermined value for the position corresponding to the aligning marks on element 78 and body 80, such that element 78 and body 80, and thus hub assembly 12, will be in known relation to the selected reference.

Thus, wheel hub assembly 12 can be installed in a normal manner on axle housing end 34, and sensor 76 can be simply installed without adjustment by inserting pin 86 into axial passage 44 and connecting it to retainer 66 or 66A, mounting coupler 110 in the required orientation on upper end 88 of pin 86, and then mounting body 80 of the coupler on kingpin 40 with element 78 in a predetermined position in body 80 and matingly connected to coupler 110. As an example, referring again to FIG. 1, wheel hub assembly 12 can be positioned such that drive axis 26 is aligned or parallel with the centerline A of axle housing end 34, or in some other known relation thereto. Coupler 110 can be positioned such that a flat side of hexagonal outer surface 120 is in predetermined relation to axis 26, such as perpendicular thereto, as shown. Screw 116 (FIGS. 3 and 4) can then be inserted in and threadedly engaged with threaded hole 114 in upper end 88 of pin 86, for holding coupler 110 in position. Sensor 76, with input element 78 oriented in predetermined relation to body 80 as shown, can then be installed on top surface 52 of kingpin 40 using screws 82 threadedly engageable in holes 84, such that coupler 110 is matingly received in receptacle 112 of element 78 to lock element 78, coupler 110 and pin 86 together with retainer 66 or 66A (FIG. 3). As a result, rotation of kingpin 40 with wheel hub assembly 12 will correspondingly rotate body 80 of sensor 76 relative to element 78, such that sensor 76 will output a signal representative of the rotation. Subsequently, if removal of sensor 76 and/or wheel hub assembly 12 from axle housing end 34 is required, reinstallation or replacement of sensor 76 is accomplished in the same manner.

Figure 5:
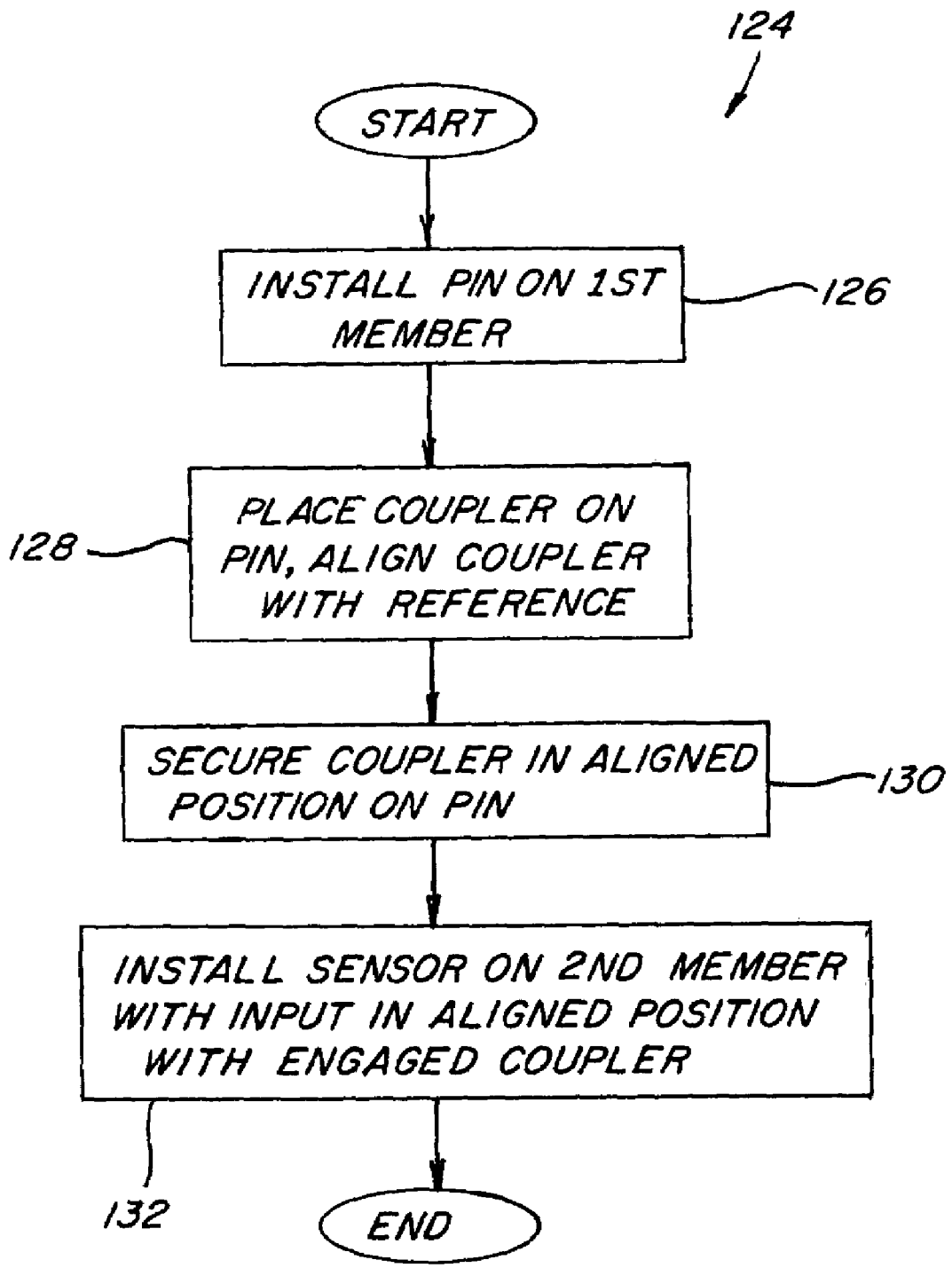
FIG. 5 is a high level flow diagram showing steps of a method of the invention.

Referring also to FIG. 5, a flow diagram 124 showing steps of installing a sensor such as, but not limited to, sensor 76, without adjustment according to the present invention, is shown. Prior to the installation, wheel hub assembly 12 is installed on axle housing end 34 in the normal manner, such that retainer 66 or 66A is in position on shoulder 68 and kingpin 40 is mounted on wheel hub assembly 12, all as explained above. As a first step, as denoted by block 126, pin 86 is installed on retainer 66 or 66A, in connection with axle housing end 34, by insertion into and through passage 44 of kingpin 40, through hole 94 of retainer 66 or 66A, and threaded engagement with nut 92. As denoted at block 128, coupler 110 is placed on upper end 88 of pin 86 and aligned with a reference, such as, but not limited to, mounting flange 22 of hub assembly 12, by aligning a flat surface portion of outer surface 120 with flange 22. Coupler 110 is then secured in the aligned position on end 88 with screw 116, as denoted by block 1. Sensor 76, with element 78 in predetermined position in body 80, can then be installed on surface 52 of kingpin 40 with screws 82, as denoted by block 132.

Here, it should be noted that the apparatus and method of the invention are adapted for use in a wide variety of other applications in addition to that set forth above. For instance, the apparatus and method of the invention are adapted for use in installing a sensor such as sensor 76 on a lower kingpin of the construction set forth herein in the same manner as set forth above. The apparatus and method of the invention are also adapted for constructions wherein the kingpin is fixedly mountable on the axle end and the wheel hub is rotatable relative thereto, such that pin 86, coupler 110 and element 78 will rotate relative to body 80 of the sensor.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method of installing a sensor in connection with relatively rotatable members, for sensing relative rotational positions thereof and outputting predetermined signals representative of the positions without requiring adjustment of the sensor, comprising steps of:

providing a sensor including a body portion mountable in a predetermined position on a first of the members, and an input rotatable relative to the body portion; and providing a coupler connectable in predetermined rotational relation to the input of the sensor and adjustably rotatable and fixedly mountable in connection with a second of the members, to allow adjustably rotatably positioning of the coupler and the input in any orientation such that when the coupler is fixedly mounted in connection with the second of the members and connected in the predetermined rotational relation to the input and the body portion is mounted in the predetermined position on the first of the members, the input will be positioned such that the sensor will output the predetermined signals when the members are relatively rotated.

2. The method of claim 1, comprising the additional step of:

adjustably rotating the coupler and the input as required such that when the coupler is fixedly mounted in connection with the second of the members and connected in the predetermined rotational relation to the input and the body portion is mounted in the predetermined position on the first of the members, the input will be positioned such that the sensor will output the predetermined signals when the members are relatively rotated.

3. The method of claim 2, comprising the additional step of:
fixedly mounting the coupler in connection to the second of the members and mounting the body portion of the sensor in the predetermined position on the first of the members.

4. The method of claim 1 wherein the coupler is fixedly mountable in connection with the second of the members on a pin fixedly connected to the second of the members for rotation therewith.

5. The method of claim 4 wherein the members are relatively rotatable about an axis of rotation, the pin is mounted in axially extending relation on the second of the members, and the coupler is adjustably positionable on and rotatable about the pin, for positioning the coupler such that when the coupler is fixedly mounted on the pin in connection with the second of the members and connected in the predetermined rotational relation to the input and the body portion is mounted in the predetermined position on the first of the members, the input will be positioned such that the sensor will output the predetermined signals when the members are relatively rotated.

6. The method of claim 5, wherein the first of the members comprises a kingpin of a hub assembly of a vehicle, the second of the members comprises an axle assembly of the vehicle connected to the hub assembly by the kingpin such that the pin extends into one end of an axial passage in the kingpin, and the body portion of the sensor is fixedly mountable in the predetermined position on the kingpin adjacent to an opposite end of the axial passage therethrough, such that when the body portion is mounted on the kingpin the coupler will be connected in the predetermined rotational relation to the input of the sensor.

7. The method of claim 6, wherein the pin is fixedly connectable to a grease retainer fixedly mountable on the wheel hub assembly in covering relation to the one end of the axial passage in the kingpin.

8. A method of installing a sensor on a kingpin connecting a steerable wheel to a vehicle for rotation about an axis through the kingpin, for sensing a steering angle of the wheel about the axis without requiring adjusting the sensor, comprising the steps of:
installing a coupler on an element in connection with the wheel such that a connector element of the coupler for matingly connecting to a rotatable input portion of the sensor is oriented in a rotational position about the axis corresponding to a rotational position of the wheel about the axis, wherein when installing the coupler, the coupler is axially rotated relative to the element of the wheel for adjustably orienting the connector element in the predetermined rotational position and is then fixedly connected to the element of the wheel; and
installing the sensor on the kingpin, wherein the kingpin includes an axial passage therein, and the element in connection with the wheel comprises a pin mounted on a grease seal mounted on a wheel hub assembly connected to the vehicle by the kingpin, the grease seal covering one end of the axial passage and the pin extending axially therein, adjacent to an end of the axial passage opposite the one end with the rotatable input portion of the sensor matingly connected to the connector element for rotation therewith so as to be in a predetermined rotational position relative to the wheel about the axis and so as to rotate correspondingly to any rotation of the wheel about the axis.

9. The method of claim 8, wherein the connector element and the rotatable input portion of the sensor comprise elements matingly engageable in at least one predetermined relative rotational orientation about the axis.

10. Apparatus for installing a sensor for sensing steering positions of a wheel hub assembly rotatable about a steering axis through a kingpin connecting the wheel hub assembly to a vehicle, the wheel hub assembly having a predetermined steering position about the steering axis, the apparatus comprising:
a member mountable in connection with the wheel hub assembly for rotation therewith about the steering axis adjacent to one end of an axial passage through the kingpin,
an element fixedly mountable to the member for rotation therewith about the steering axis and so as to extend axially through at least a portion of the axial passage through the kingpin;
a sensor including a body fixedly mountable on the kingpin in a predetermined orientation about the steering axis adjacent to an end of the axial passage opposite the one end thereof, the sensor including an input rotatable about the steering axis including a predetermined relational position corresponding to the predetermined steering position of the wheel; and
a coupler connectable to the input of the sensor for joint rotation thereof about the steering axis, the coupler being adjustably mountable on the element in the axial passage in any rotational orientation about the steering axis for rotation therewith, for coupling the input to the element for joint rotation such that the rotational position of the input will correspond to the steering position of the wheel about the steering axis.

11. The apparatus of claim 10, wherein the member mountable in connection with the wheel hub assembly for rotation therewith about the steering axis adjacent to one end of an axial passage through the kingpin, comprises a grease retainer.

12. The apparatus of claim 11, wherein the element fixedly mountable to the grease retainer for rotation therewith about the steering axis and so as to extend axially through at least a portion of the axial passage through the kingpin, comprises an elongate pin.

13. The apparatus of claim 12, wherein the coupler is positionable on the pin for axial rotation thereabout and fixedly mountable in a desired rotational position thereon.

14. The apparatus of claim 13, wherein the coupler is fixedly mountable in the desired rotational position on the pin by a fastener.

15. The apparatus of claim 13, wherein the coupler is fixedly mountable in the desired rotational position on the pin by a press fit.

16. Apparatus for installing a sensor in connection with relatively rotatable members, for sensing relative rotational positions thereof and outputting predetermined signals representative of the positions without requiring adjustment of the sensor, comprising:
(a) a sensor including a body mountable in a predetermined position on a first of the members, and an input rotatable relative to the body; and
(b) a coupler connectable in predetermined rotational relation to the input of the sensor and adjustably rotatable and fixedly mountable in connection with a second of the members on a pin fixedly connected to the second of the members for rotation therewith, wherein the members are relatively rotatable about an axis of rotation, the pin is mounted in axially extending relation on the second of the members, and the coupler is adapted to be adjustably positionable on and rotatable about the pin, for positioning the coupler and the input as required such that when the coupler is fixedly mounted on the pin in connection with the second of the members and connected in the predetermined rotational relation to the input and the body is mounted in the predetermined position on the first of the members, the input will be positioned such that the sensor will output the predetermined signals when the members are relatively rotated.

17. The apparatus of claim 16, wherein the first of the members comprises a kingpin of a hub assembly of a vehicle, the second of the members comprises an axle assembly of the vehicle connected to the hub assembly by the kingpin such that the pin extends into one end of an axial passage in the kingpin, and the body of the sensor is fixedly mountable in the predetermined position on the kingpin adjacent to an opposite end of the axial passage therethrough, such that when the body is mounted on the kingpin the coupler will be connected in the predetermined rotational relation to the input of the sensor.

18. The apparatus of claim 17, wherein the pin is fixedly connectable to a grease retainer fixedly mountable on the wheel hub assembly in covering relation to the one end of the axial passage in the kingpin.

* * * * *